(12) United States Patent
Baranowski

(10) Patent No.: US 10,404,834 B1
(45) Date of Patent: Sep. 3, 2019

(54) DYNAMIC VERIFICATION OF APPLICATION DATA USING DETERMINISTIC FUNCTIONS

(71) Applicant: Amazon Technologies, Inc., Reno, NV (US)

(72) Inventor: Matthew Paul Baranowski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 812 days.

(21) Appl. No.: 13/794,640

(22) Filed: Mar. 11, 2013

(51) Int. Cl.
  G06F 7/00 (2006.01)
  G06F 11/00 (2006.01)
  G06F 12/14 (2006.01)
  G06F 12/16 (2006.01)
  H04L 29/06 (2006.01)

(52) U.S. Cl.
  CPC ................................ H04L 67/42 (2013.01)

(58) Field of Classification Search
  CPC ..... G06F 2201/00; H04L 9/06; H04L 9/0643; H04L 9/3223; H04L 67/1065; H04L 29/06857; H04L 2463/082
  USPC ........................................................ 709/203
  See application file for complete search history.

(56) References Cited

U.S. PATENT DOCUMENTS

| | | | | |
|---|---|---|---|---|
| 6,496,824 B1 * | 12/2002 | Wilf | ..................... | G06Q 20/085 705/52 |
| 6,594,665 B1 * | 7/2003 | Sowa | ................ | G06F 17/30949 |
| 7,640,578 B2 * | 12/2009 | Vasnani | ............... | H04L 63/0807 726/10 |
| 7,676,556 B2 * | 3/2010 | Goldstein | ........... | H04L 41/5067 709/203 |
| 8,037,307 B2 * | 10/2011 | Irwin, Jr. | ................ | G07F 17/32 273/139 |
| 8,271,613 B2 * | 9/2012 | Cunningham | ......... | G06Q 40/04 705/37 |
| 8,607,335 B1 * | 12/2013 | Liu | ....................... | G06F 21/567 713/188 |
| 8,924,466 B2 * | 12/2014 | Seed | ................... | H04L 67/1095 709/203 |
| 8,990,431 B2 * | 3/2015 | Goel | ................... | H04L 67/1002 709/249 |
| 8,997,239 B2 * | 3/2015 | Kanakapura | ............ | G06F 21/51 726/26 |
| 2001/0042171 A1 * | 11/2001 | Vermeulen | .......... | G06F 16/9574 711/118 |

(Continued)

*Primary Examiner* — Kevin T Bates
*Assistant Examiner* — Golam Mahmud
(74) *Attorney, Agent, or Firm* — Hogan Lovells US LLP

(57) ABSTRACT

A client can request, from a server, files needed to run a web application at the client (e.g., via a client web browser). The server can serve the requested files to the client along with a file identifier for each of the files. The file identifier for a respective file can be generated dynamically based on the contents of the respective file. When the requested files and the file identifiers are received at the client, the client can dynamically generate a validation code based on the file identifiers. Similarly, at the server, a verification code can be generated dynamically based on the file identifiers transmitted. To verify that the client has the appropriate files for running the web application, the server can compare the validation and verification codes. If the two codes match, then it can be verified that the client has the appropriate files for the web application.

25 Claims, 8 Drawing Sheets

(56) References Cited

U.S. PATENT DOCUMENTS

| | | | |
|---|---|---|---|
| 2002/0112162 A1* | 8/2002 | Cocotis | H04L 63/08 713/176 |
| 2004/0199809 A1* | 10/2004 | Hanam | G06F 11/1004 714/4.1 |
| 2005/0010794 A1* | 1/2005 | Carpentier | G06F 16/137 713/193 |
| 2005/0165828 A1* | 7/2005 | Lango | G06F 12/0866 |
| 2007/0150517 A1* | 6/2007 | Malone | H04L 9/3263 |
| 2007/0208800 A1* | 9/2007 | Frohlich | G06F 21/602 709/203 |
| 2007/0239727 A1* | 10/2007 | Anderson | G06F 17/30873 |
| 2009/0241174 A1* | 9/2009 | Rajan | G06F 21/31 726/5 |
| 2009/0313683 A1* | 12/2009 | Murakawa | G06F 21/629 726/5 |
| 2010/0071041 A1* | 3/2010 | Ikegami | G06F 21/32 726/6 |
| 2010/0138477 A1* | 6/2010 | Hanus | G06F 16/958 709/203 |
| 2012/0017079 A1* | 1/2012 | Mraz | H04L 9/3236 713/153 |
| 2012/0255027 A1* | 10/2012 | Kanakapura | G06F 21/51 726/26 |
| 2013/0166514 A1* | 6/2013 | Schultz | G06F 21/64 707/690 |
| 2013/0318350 A1* | 11/2013 | Nakano | H04L 9/0841 713/168 |

* cited by examiner

DYNAMIC VERIFICATION OF APPLICATION DATA USING DETERMINISTIC FUNCTIONS

BACKGROUND

Computing devices are becoming more commonplace and are being used for a wider variety of purposes. Computing devices can be used by a user, for example, to view streaming media content, to check email, and to browse the Internet. In particular, a computing device can be used to run a web application via a browser of the computing device. The computing device (i.e., client computing device, client) can request files to be transferred from a server in order to run the web application. For example, an application can require particular files in order to run properly. Sometimes, transmission errors can occur and cause the files to be transferred incorrectly (e.g., missing files). As such, the application might not run properly using the incorrectly transferred files. Furthermore, the browser of the computing device can have been configured to cache browsing data. For example, the browser can have previously cached some of the files required by the application. However, in some cases, the files cached by the browser can be incorrect (e.g., the cached files can be older versions, the cached files can include corrupted data). Thus, the application might not run properly using the cached files. When web browsing and web applications do not work properly, it can be inconvenient to the user of the computing device and reduce the overall user experience associated with using the computing device.

BRIEF DESCRIPTION OF THE DRAWINGS

Various embodiments in accordance with the present disclosure will be described with reference to the drawings, in which.

DETAILED DESCRIPTION

Figure 1:
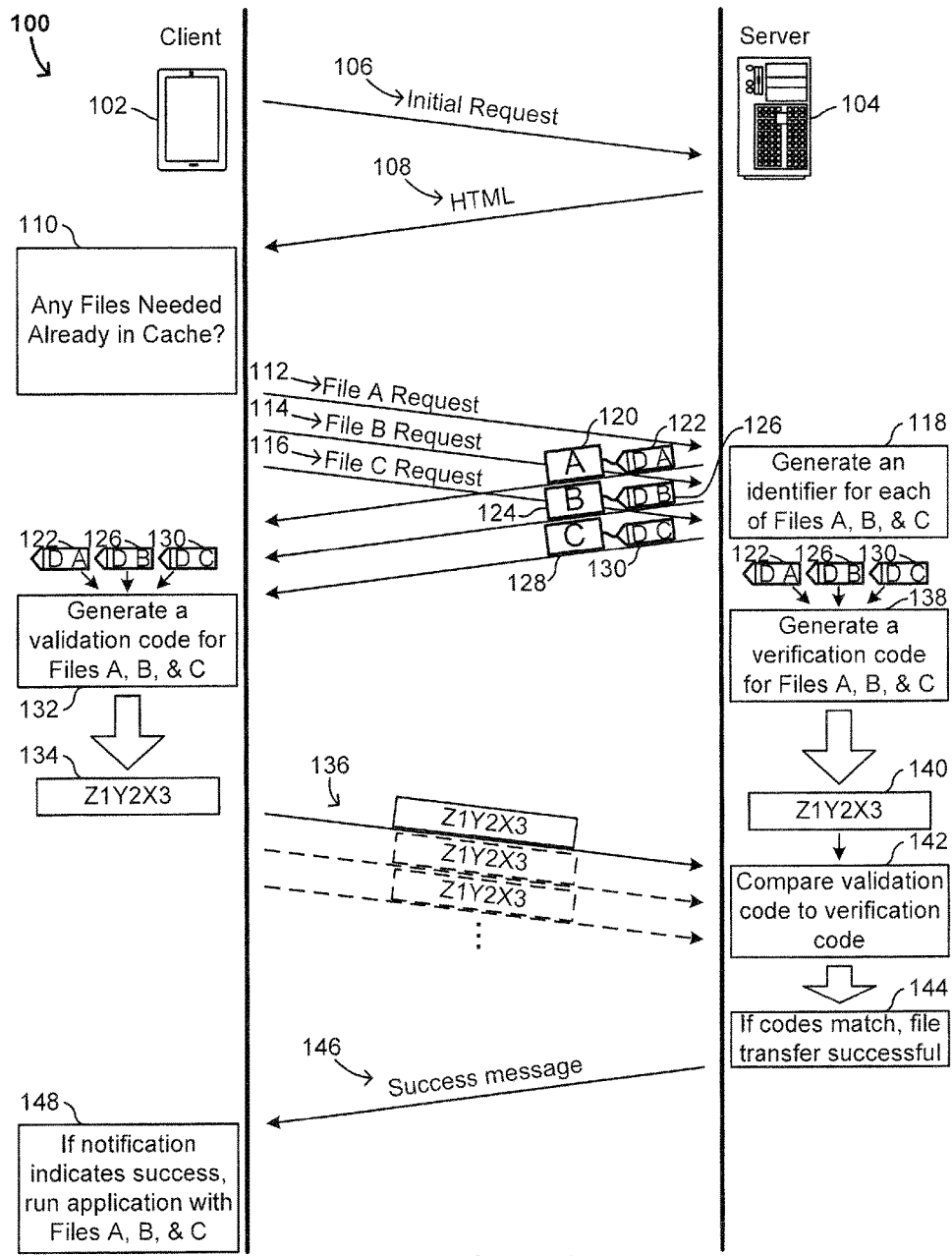
FIG. 1 illustrates an example environment in which aspects of the various embodiments can be utilized.

Systems and methods in accordance with various embodiments of the present disclosure overcome one or more of the above-referenced and other deficiencies in conventional approaches to browsing content on a network. Specifically, various embodiments of the present disclosure enable a client-server system to dynamically verify that a client computing device has the appropriate files needed to run a particular web application.

Various embodiments of the present disclosure enable a client device to request files from a server. In some embodiments, the files can be required to run a web application at the client (e.g., via a web browser of the client). In some embodiments, the web application can be an active script-based application, such a JavaScript-based application. The server can serve the requested files to the client along with a file identifier for each of the files. The file identifier for a respective file can be generated based on the contents of the respective file. In one example, a file identifier for a respective file can be generated by inputting a string representation of the respective file's contents into a deterministic function (e.g., a one-way hash function) to result in an output, which can correspond to the file identifier for the respective file. As such, each file identifier can represent (the contents of) a distinct respective file. In some embodiments, the file identifiers can be generated dynamically as their respective files are being served (e.g., transmitted) to the client.

When the requested files as well as the file identifiers are received at the client, the client can generate a validation code. The validation code can be generated at the client based on the file identifiers for the files received. For example, the validation code can be generated by inputting string representations of the received file identifiers into a deterministic function (e.g., a one-way hash function) to result in an output, which can correspond to the validation code. Similarly, at the server, a verification code can be generated based on the file identifiers transmitted. The server can generate the verification code in a fashion similar to how the client generates the validation code (e.g., using a similar/same deterministic function). In some embodiments, the validation code and/or the verification code can be generated dynamically.

The client can send the validation code to the server for the server to verify that the client has the appropriate files for running the web application. The server can verify by comparing the validation code with the verification code. If the two codes match, then the validation code is valid, the verification that the client has the appropriate files is successful, and the server can send a verification success message. If the two codes do not match, then the validation code is invalid, the verification is unsuccessful, and the server can send an error message to the client. The client can address the error accordingly.

Moreover, the client can utilize a web browser configured to render a web page and run the web application. In some embodiments, the web browser can enable caching and thus can have previously cached at least some of the files needed for running the web application. It is known in the art that caching files can causes errors and/or unexpected application behavior. Conventional approaches can use timestamps attached to files in order to circumvent the problems associated with browser caching. However, various embodiments of the present disclosure offer a more reliable and complete approach.

Various other functions and advantages are described and suggested below as may be provided in accordance with the various embodiments.

FIG. 1 illustrates an example environment 100 in which aspects of the various embodiments can be utilized. The example environment 100 can include a client (i.e., client computing device, client device, etc.) 102 and a server 104. The client device 102 can be any computing device (see FIG. 7 and FIG. 8 for more detail) capable of accessing, via a network, one or more services made available by the server 104. The server 104 can be any computer hardware and/or software that provides one or more services, such as web services, via the network for the client(s) 102 to access. Further descriptions and examples of the server 104 as well as the client 102 are discussed below, for example, with reference to FIG. 9.

In one example, the client 102 can request data from the server 104 to view a web site containing a web application. In some embodiments, the web application can be an active script-based application, such as a JavaScript-based application. Continuing with the example, the client 102 can be running a web browser configured to render the data received from the server 104. As shown in FIG. 1, the client 102 can make an initial request 106 to the server 104 to get data for viewing the web site. The server 104 can respond by sending a HyperText Markup Language (HTML) file 108 back to the client 102. The HTML file 108 can specify which files are needed in order to run the web application on the web site requested by the client 102. In this example, the HTML file 108 can specify that the client 102 needs File A 120, File B 124, and File C 128.

The client 102 can check the cache of its web browser to see if any of the files needed have already (e.g., previously) been cached 110. In the example of FIG. 1, none of the files needed have been cached at the client 102. Thus, the client 102 can send a request (e.g., a Hypertext Transfer Protocol (HTTP) request) to the server 104 for each of the files needed. As shown in FIG. 1, the client 102 can send a request 112 for File A, a request 114 for File B, and a request 116 for File C.

When the server 104 receives the requests (112, 114, and 116) for File A 120, File B 124, and File C 128, respectively, the server 104 can transmit the requested files back to the client 102. The server 104 can generate 118 a file identifier for each of the files to be transmitted back to the client 102. In other words, the server 104 can generate 118 a first identifier (e.g., "ID A" 122) for File A 120, a second identifier (e.g., "ID B" 126) for File B 124, and a third identifier (e.g., "ID C" 130) for File C 128.

In some embodiments, each file identifier can be generated by inputting at least a portion of the respective file's contents into a deterministic function (i.e., a function that, for a given input, will always generate the same output). For example, there can be a string representation (e.g., string of characters) for the contents of a file. The string representation of the file can be inputted into the deterministic function, such as a hash function, to generate an output, which can correspond to the file identifier for the file. In some embodiments, the deterministic function can utilize a one-way hashing algorithm to generate 118 the file identifier for each respective file. In some embodiments, the file identifier for each respective file can be included and/or incorporated into each respective file (e.g., included/incorporated with the contents of each respective file).

In some embodiments, the generating 118 of the file identifiers by the server 104 can be performed dynamically. For example, in response to the client's requests (112, 114, 116), the server 104 sends the files (120, 124, 128). The server 104 can generate a file identifier for each file as that file is being sent. Specifically, when transmitting a file, the server 104 can be sending small segments of data (e.g., characters, portions of the string representation, data bits, etc.) representative of (the contents of) the file. As the segments of data are being sent, the server 104 can read and/or apply logical operations (e.g., mathematical operations, etc.) on the segments of data. As such, the deterministic function can be applied to the data segments via the operations as the segments are sent. In a particular example, as each character in a string representation of a file is being sent, the server 104 can convert the character into a hash value portion. Then the hash value portions, converted from the characters sent, can collectively form the hash value, which can correspond to the identifier for the file.

Continuing with FIG. 1, when the client 102 receives the requested files (File A 120, File B 124, and File C 128), the file identifiers (122, 126, 130) for each corresponding file can also be included. The client 102 can take the file identifiers (122, 126, 130) and further apply a deterministic function (e.g., hash function) to the file identifiers to generate 132 a validation code 134 for the files (120, 124, 128) collectively. In other words, the client 102 can use the file identifiers (122, 126, 130) as input into the deterministic function to generate 132 an output, which corresponds to the validation code 134. Accordingly, in some embodiments, the validation code 134 can be a hash value of the file identifiers (122, 126, 130), each of which is also a hash value.

As shown in FIG. 1, the server 104 can generate 138 a verification code 140 for the transmitted files (File A 120, File B 124, and File C 128). Similar to the client 102, the server 104 can take the file identifiers (122, 126, 130) and further apply a deterministic function to the file identifiers to generate 138 the verification code 140 for the files (120, 124, 128) collectively. In other words, the server 104 can use the file identifiers (122, 126, 130) as input into the deterministic function to generate 138 an output, which can correspond to the verification code 140. Therefore, in some embodiments, the verification code 140 can be a hash value of the file identifiers (122, 126, 130), each of which is also a hash value. Also, the deterministic function used by the server 104 can be a similar (e.g., the same) function as that used by the client 102, and vice versa.

In some embodiments, the client's generating 132 of the validation code 134 and/or the server's generating 138 of the verification code 140 can be performed dynamically. For example, the client 102 can initiate the generating 132 of the validation code 134 as the file identifiers are being received at the client 102 (e.g., the client 102 can input the received data segments for the file identifiers into a client-side hash function). In another example, the server 104 can initiate the generating 138 of the verification code 140 as the file identifiers are being created and/or transmitted (e.g., the server 102 can input the newly created/transmitted data segments for the file identifiers into a server-side hash function, the server-side hash function being similar or the same as the client-side hash function).

As illustrated in FIG. 1, after the validation code 134 has been generated 132 at the client 102, the validation code 134 can be sent 136 from the client 102 to the server 104 in order for the server 104 to verify whether or not the client 102 has the right files (120, 124, 128). In some embodiments, if the web application is a JavaScript-based application for example, the client 102 makes various communications with the server 104 via Asynchronous JavaScript and XML (AJAX) calls and the validation code 134 can be sent to the server 104 via one of the AJAX calls (e.g., the validation code 134 can be included in an HTTP header associated with an AJAX call).

At the server-side, to verify whether or not the client 102 has the right files, the server 104 can compare 142 the validation code 134 from the client 102 to the verification code 140 generated by the server 104. As discussed previously, the deterministic function used to generate 132 the validation code 134 at the client 102 should be a similar (or the same) function as that used to generate 138 the verification code 140 at the server 104. As such, if the client 102 has the files that the client 102 is supposed to have (i.e., the files that the server 104 has and transmitted), then the client's files should have the same file identifiers as those that were generated and transmitted by the server 104. Hence, it should also be the case that the validation code 134 generated 132 from the client-side file identifiers should be the same as the verification code 140 generated 138 from the server-side file identifiers.

So it follows that when the client's validation code 134 matches the server's verification code 140, then the files that the client 102 has should be the same as those that the server 104 had transmitted. In the example of FIG. 1, when the validation code 134 matches the verification code 140, it is an indication that the files (120, 124, 128) were transferred successfully 144 from the server 104 to the client 102. As such, the server 104 can send a message 146 to the client 102 indicating that the client's validation code 102 is valid (and that the files that the client 102 has, are correct).

When the client 102 receives the message 146 indicating that the files at the client 102 are correct, then the client 102 can elect to run 148 the web application using the files (120, 124, 128).

In some embodiments, the client 102 can transmit 136 the validation code 134 repeatedly. For example, the transmission(s) 136 of the validation code 134 can piggyback on various communications (e.g., AJAX calls, API calls, etc.) from the client 102 to the server 104. In some embodiments, the client 102 can live through (e.g., when the client 102 is long-lived) a server update. The server update can cause the verification code 140 to be altered. As such, the repeated transmissions 136 of the client's validation code can cause the server 104 to compare 142 a repeated validation code from the client 102 with the altered verification code at the server 104, which can result in a mismatch due to the verification code being altered. Thus, the server 104 can transmit an error message back to the client 102.

Figure 2:
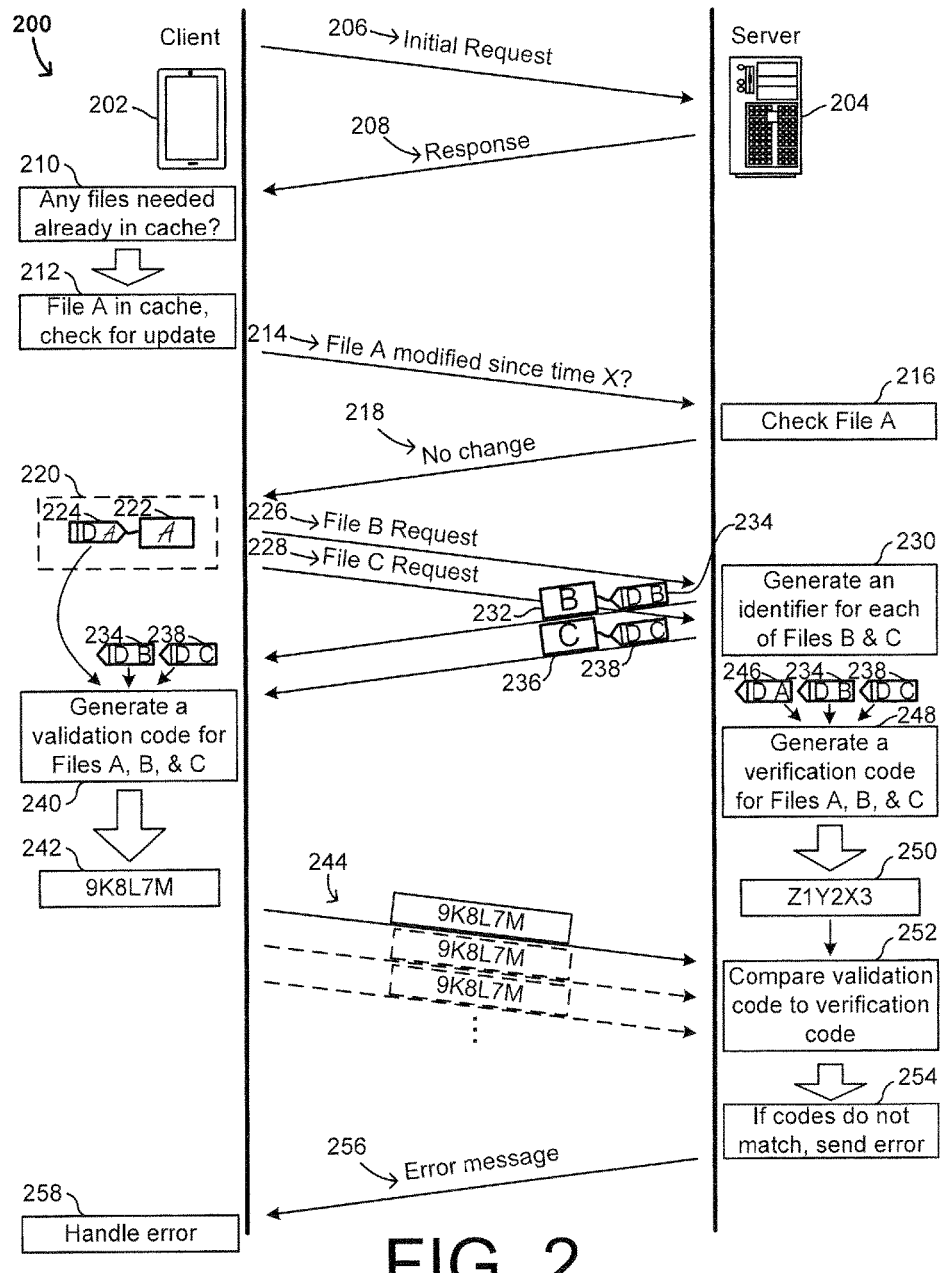
FIG. 2 illustrates an example system embodiment for dynamically verifying application data using deterministic functions.

Referring now to FIG. 2, FIG. 2 shows an example system embodiment 200 for dynamically verifying application data using deterministic functions. The example system embodiment 200 can comprise a client 202 and a server 204. In one example, the client 202 can request 206 the server 204 for data needed to run a web application or other program. The server 204 can respond with information 208 that specifies the files needed by the client 202 to run the web application properly. In this example, the files needed are File A, File B, and File C.

Continuing with the example, the client 202 can check 210 its cache 220 (e.g., a cache of a web browser running on the client 202) to see whether or not any of the files needed are already in the cache 220. In this example, the cache 220 can already contain one of the files needed (e.g., File A 222) as well as a file identifier (e.g., "ID A" 224) for the file. The client 202 can check 212 whether or not the File A 222 in the cache 220 is up to date and/or appropriate for running with the web application. The client 202 can query 214 the server 204 in regards to whether or not the File A 222 in the client's cache 220 is appropriate (e.g., the client 202 can query 214 the server 204 asking whether or not File A had been modified since being stored in the client's cache 220). In the example, the server 204 checks 216 the server's repository (not shown in FIG. 2) to see whether the server's File A had been modified since the specified time period (e.g., time X, the time when File A 222 was cached at the client 202). The server 204 determines that its File A had not been changed since that time and sends a message 218 indicating this information (e.g., no change to File A since time X) to the client 202.

Therefore, the client 202 has reason to believe that the File A 222 and file identifier "ID A" 224 stored at the client-side cache 220 would be the same as the File A and "ID A" on the server 204. However, a person of ordinary skill in the art would recognize that often times, this may not be the case. In other words, it is known in the art that files cached with a web browser are often times not what they are supposed to be (e.g., cached files can become corrupted, lost, stored incorrectly, or can encounter other problems, etc.). As it applies to the current example, the client's File A 222 and its identifier 224 have incurred errors during storage, unbeknownst to the client 202, and are actually not exactly the same as the server's File A and identifier (not shown in FIG. 2).

Nevertheless, since the client 204 believes that it has the correct version of File A in its cache 220, the client 204 goes on to make a request 226 for File B and a request 228 for File C, without requesting for File A. In response to the client requests, the server 204 transmits the requested File B 232 and File C 236. Moreover, the server 204 can generate 230 file identifiers "ID B" 234 and "ID C" 238 for File B 232 and File C 236, respectively. The file identifiers 234 and 238 can be transmitted along with the files 232 and 236 back to the client 202. As discussed above, each file identifier can be generated 230 based on hashing the contents of the identifier's respective file. Also as discussed above, the file identifiers can be generated 230 dynamically, for example, as the files are being transmitted to the client 202.

Continuing with the example of FIG. 2, the client 202 can receive the files (File B 232 and File C 236) along with their file identifiers ("ID B" 234 and "ID C" 238, respectively). The client 202 can then take the file identifiers (224, 234, 238) for all of the files needed (222, 232, 236) for the web application, and generate 240 a validation code 242 based on the file identifiers. As discussed above, the validation code 242 can be generated 240 based on hashing the file identifiers. Also as discussed above, the validation code 242 can be generated 240 dynamically, for example, as the file identifiers are being received at the client 202.

However, File A 222 and its identifier "ID A" 224 are erroneous. Even though File B 232 and File C 236 (and "ID B" 234 and "ID C" 238) may be correct, the validation code 242 will be generated 240 to incorporate the erroneous File A 222 and "ID A" 224. Thus, when the client 202 generates 240 the validation code 242 for the files (222, 232, 236), the validation code 242 will not be the same as a verification code 250 generated 248 at the server 202 using the correct version of File A and "ID A" 246 (as well as "ID B" 234 and "ID C" 238). Nonetheless, the client 202 transmits 244 the validation code 242 to the server 204 for verification. The server 204 compares 252 the validation code 242 to the verification code 250 generated 248 at the server 204 using "ID B" 234, "ID C" 238, and the correct "ID A" 246. (Again, in some embodiments, the verification code 250 can be generated 248 dynamically and/or via a deterministic function similar to/same as that at the client 202.) Continuing with the example, based on the comparison 252, the server 204 determines that the codes (242 and 250) do not match 254 and sends an error message 256 to the client 202.

In some embodiments, the client 202 can acknowledge the error and handle accordingly 258. For example, the client 202 can display an error message to a user of the client 202. In another example, the client 202 can decide to (re-)request from the server 204 all of the files (File A, File B, and File C) needed for the web application while disregarding and/or discarding its cached File A 222 and "ID A" 224.

Similar to previous discussions, in some embodiments, the client 202 can transmit 244 the validation code 242 repeatedly. For example, the transmission(s) 244 of the validation code 242 can piggyback on various communications (e.g., AJAX calls, API calls, etc.) from the client 202 to the server 204.

Figure 3:
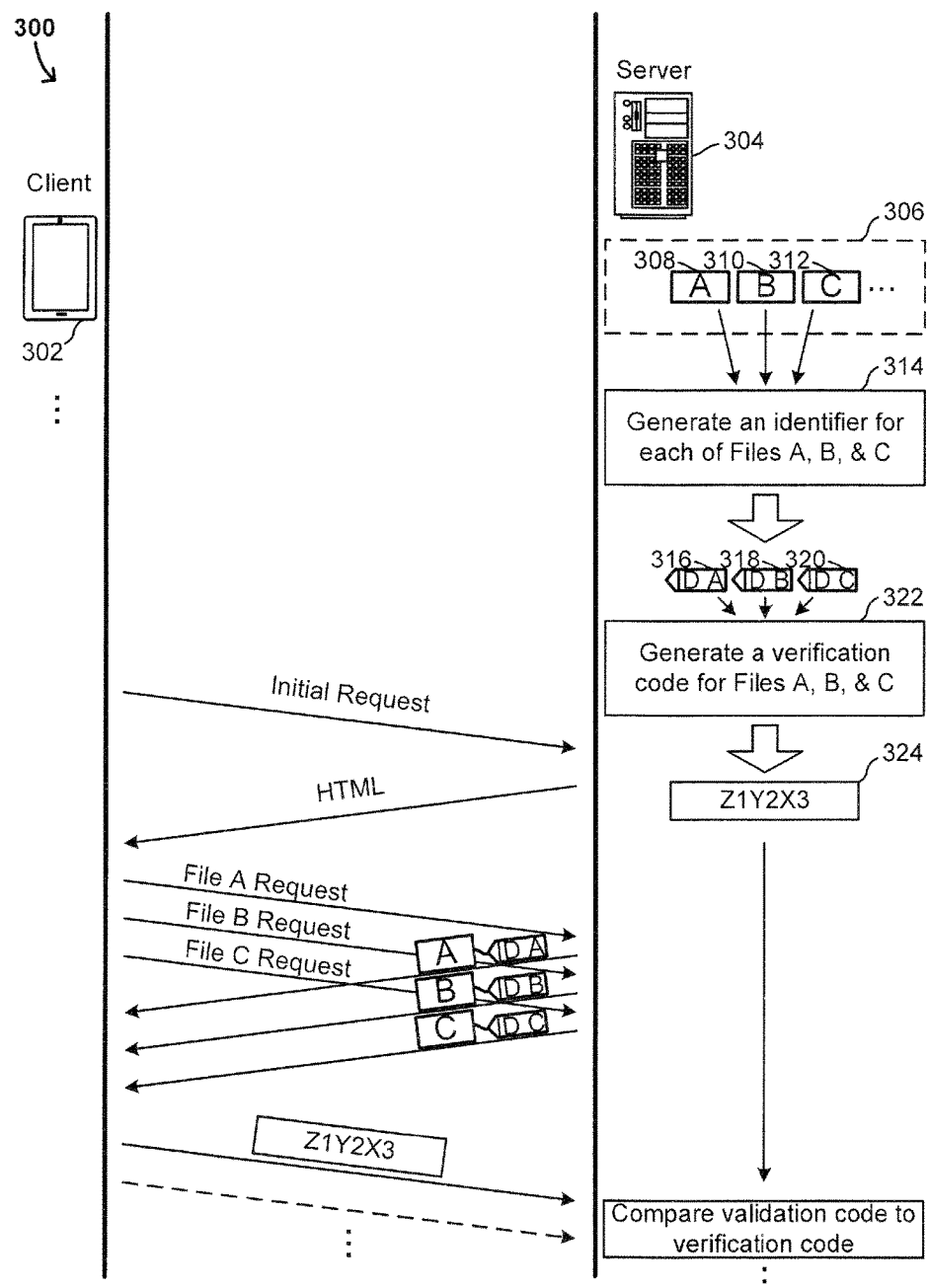
FIG. 3 illustrates an example system embodiment for dynamically verifying application data using deterministic functions.

FIG. 3 illustrates an example system embodiment 300 for dynamically verifying application data using deterministic functions. The example system embodiment 300 of FIG. 3 can include a client 302 and a server 304. The server 304 can also include a repository 306 (not shown in FIG. 1 and FIG. 2) configured to store various files and data served.

In one example, the client 302 can require certain files (e.g., File A 308, File B 310, File C 312) in order to run/execute/operate a web application. The server 304 can have access to this information, which specifies that a certain web application can require particular files (e.g., File A 308, File B 310, File C 312). In some embodiments, the server 304 can generate 314 the file identifiers (316, 318, 320) for the files (308, 310, and 312, respectively) prior to the request for the files by the client 302 or another party. Moreover, in some embodiments, the server 304 can generate 322 the verification code 324 for the files (308, 310, 312) prior to the request for the files by the client 302 or another party.

It is further contemplated that a person having ordinary skill in the art would recognize that the server 304 can generate 314 the file identifiers (e.g., 316, 318, 320) and/or generate 322 the verification code 324 at various times, such as at times when the server 304 has sufficient resources (e.g., when the server 304 is idle, when the server 304 is serving an amount of traffic below a specified threshold, etc.).

Figure 4:
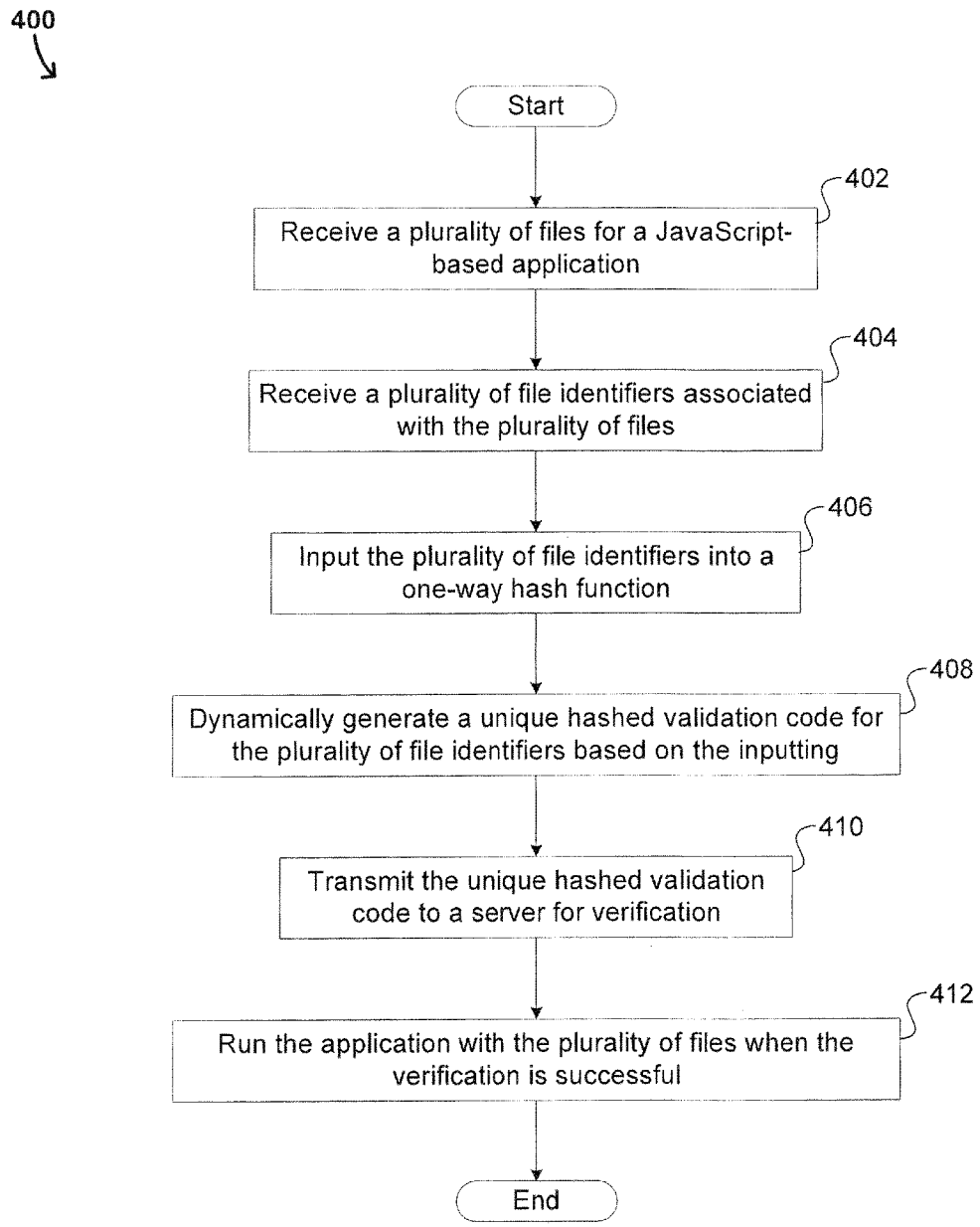
FIG. 4 illustrates an example method embodiment for dynamically verifying application data using deterministic functions.

FIG. 4 illustrates an example method embodiment 400 for dynamically verifying application data using deterministic functions. It should be understood that there can be additional, fewer, or alternative steps performed in similar or alternative orders, or in parallel, within the scope of the various embodiments unless otherwise stated. The example method embodiment 400 can start with receiving a plurality of files configured to run with an active script-based application on a client, at step 402. In some embodiments, the active script-based application can be a JavaScript-based application.

Step 404 includes receiving a plurality of file identifiers associated with the plurality of files. Each file identifier can correspond to a respective file. Each file identifier can also be dynamically created from an output of a first one-way hash function that utilizes contents of the respective file as input. For example, a string representation of the respective file's contents can be inputted into the first one-way hash function to create the file identifier for the respective file. At step 406, the example method 400 can input at least the plurality of file identifiers into a second one-way hash function. Step 408 can include dynamically generating a "unique" hashed validation code for the plurality of file identifiers. In some embodiments, the hashed validation code can be "unique" in that it would be highly unlike for another hashed code to be equivalent. The unique hashed validation code can represent the plurality of file identifiers collectively. The unique hashed validation code can also be generated based, at least in part, on the inputting of the plurality of file identifiers into the second one-way hash function. The example method 400 can then transmit the unique hashed validation code to a server for verification, at step 410. In some embodiments, the transmission of the validation code can occur repeatedly. For example, the validation code can be included in various communications transmitted (e.g., AJAX calls, API calls, etc.) to the server. At step 412, the method 400 can run the application with the plurality of files when the verification of the unique hashed validation code is successful. In other words, the method 400 can receive a message indicating that the verification of the hashed validation code is successful, and run the application with the plurality of files in response to receipt of the message.

Figure 5:
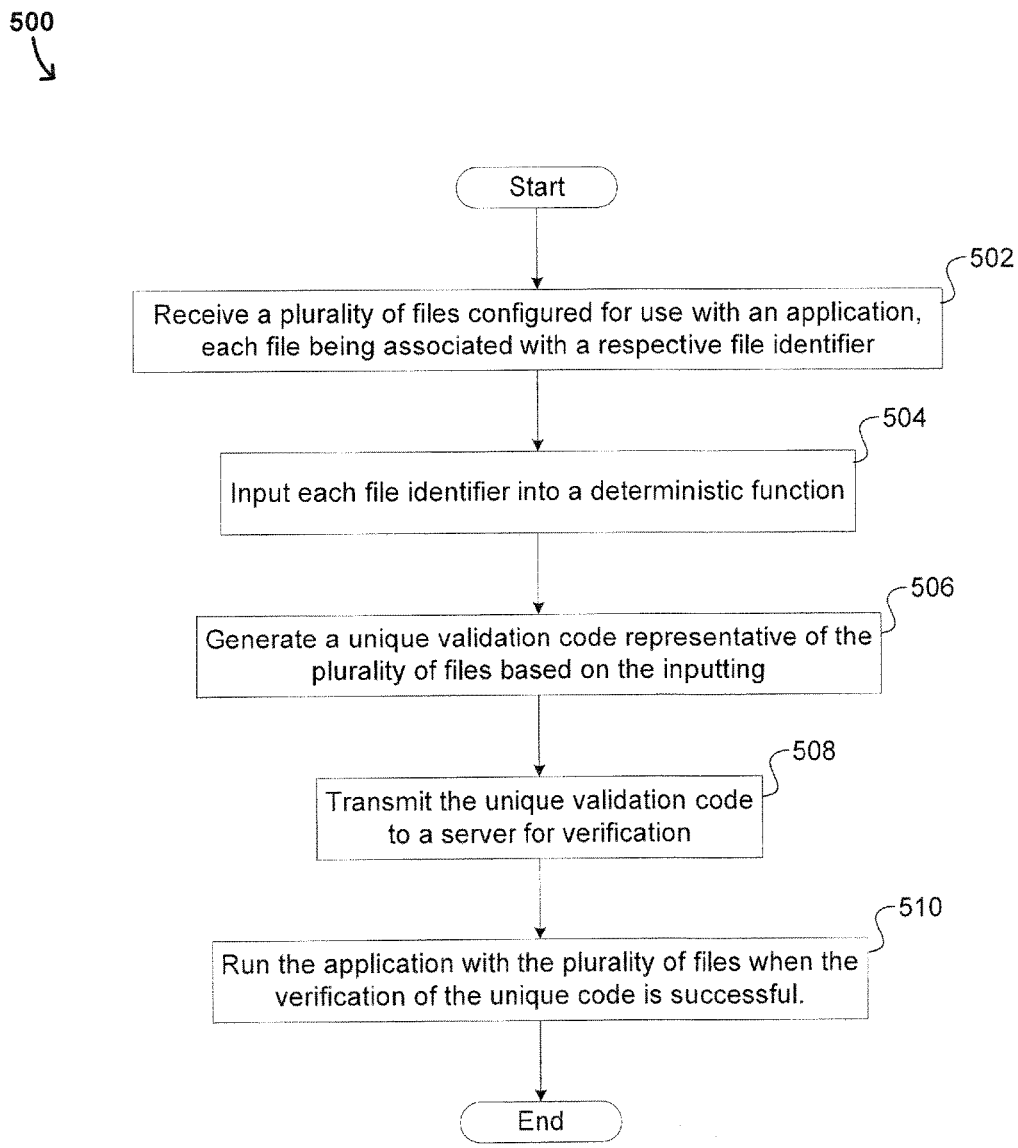
FIG. 5 illustrates an example method embodiment for dynamically verifying application data using deterministic functions.

FIG. 5 illustrates an example method embodiment 500 for dynamically verifying application data using deterministic functions. As mentioned above, it should be understood that there can be additional, fewer, or alternative steps performed in similar or alternative orders, or in parallel, within the scope of the various embodiments unless otherwise stated. The example method embodiment 500 can start with receiving a plurality of files configured for use with an application, at step 502. Each file can be associated with a respective file identifier that is generated based, at least in part, on at least a portion of a content of the file. For example, a file identifier for a respective file can be generated based, at least in part, on inputting at least a portion of the respective file's contents into a hash function incorporating a one-way hashing algorithm.

Step 504 can include inputting each file identifier into a deterministic function. In some embodiments, the deterministic function can utilize a similar (or the same) one-way hashing algorithm referred to in the preceding paragraph. The example method 500 can, at step 506, generate a "unique" validation code representative of the plurality of files. The generating can be based, at least in part, on the inputting of each file identifier into the deterministic function. Step 508 can include transmitting the unique validation code to a server for verification. In some embodiments, the transmission of the validation code can occur repeatedly. Then at step 510, the method 500 can run the application with the plurality of files when the verification of the unique validation code is successful. In other words, the method 500 can receive a message indicating that the verification of the validation code is successful, and run the application with the plurality of files in response to receipt of the message.

Figure 6:
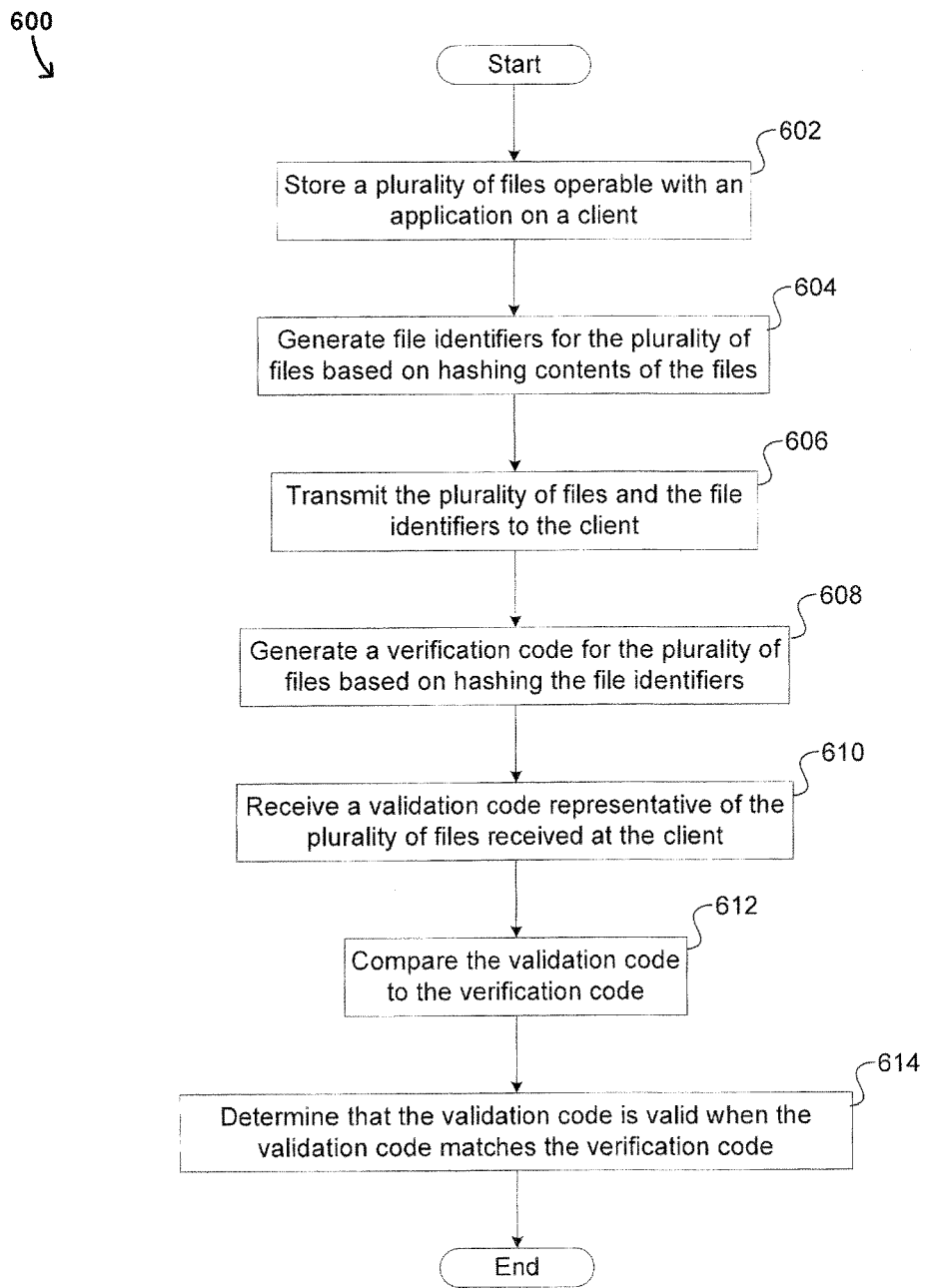
FIG. 6 illustrates an example method embodiment for dynamically verifying application data using deterministic functions.

FIG. 6 illustrates an example method embodiment 600 for dynamically verifying application data using deterministic functions. Again, there can be additional, fewer, or alternative steps performed in similar or alternative orders, or in parallel, within the scope of the present disclosure. At step 602, the example method embodiment 600 can store, at a server, a plurality of files configured to operate with an application running on a client. Step 604 can include generating file identifiers for the plurality of files. Each file identifier can correspond to a respective file and each file identifier can be generated based, at least in part, on hashing contents of the respective file. The example method 500 can, at step 606, transmit the plurality of files and the file identifiers for the plurality of files to the client. Then the method 600 can generate a verification code for the plurality of files based, at least in part, on hashing the file identifiers, at step 608. At step 610, the example method 600 can receive a validation code representative of the plurality of files received at the client. The method 600 can compare the validation code to the verification code, at step 612. Step 614 can include determining that the validation code is valid when the validation code matches the verification code. In some embodiments, the matching can be made/determined within an allowable deviation.

In some embodiments, when the server receives the validation code from the client, the server can check to whether or not the validation code has expired. If the validation code has expired, then the server can send a message to the client indicating this information.

Various embodiments of the present disclosure can also be implemented to work in conjunction with a wide variety of content browsers (e.g., web browsers). A person of ordinary skill in the art would also recognize that the various embodiments of the present disclosure can be applied in many situations and useful for many applications.

Figure 7:
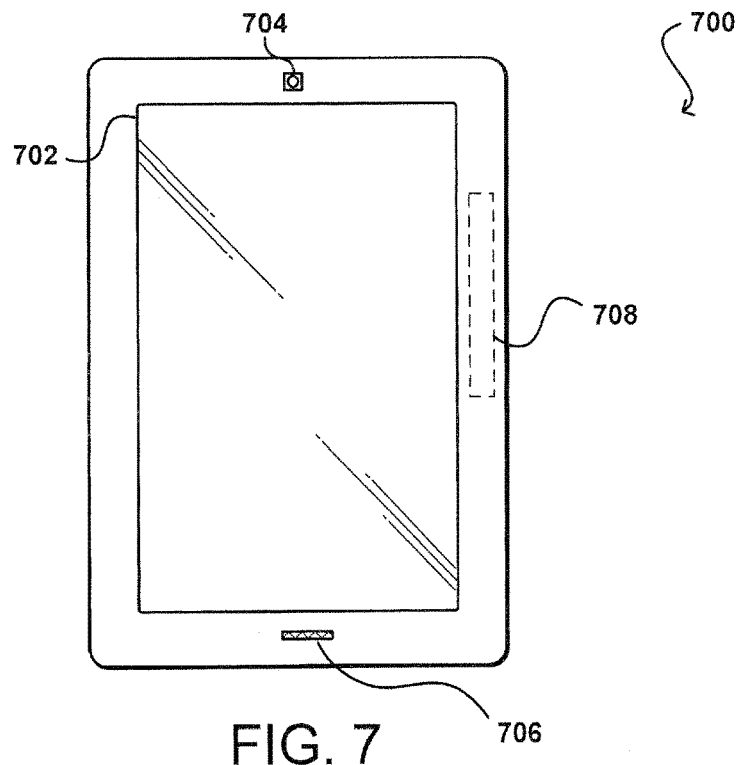
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
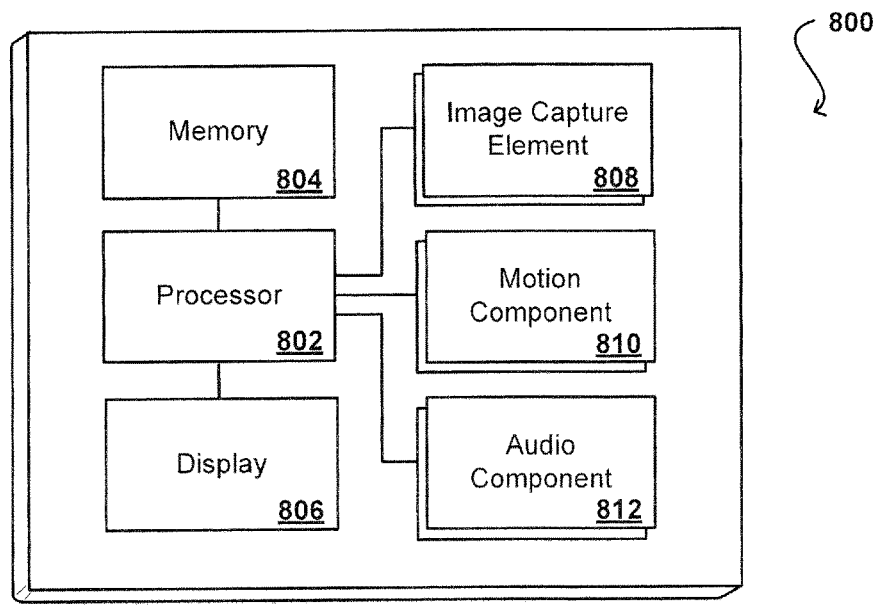
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
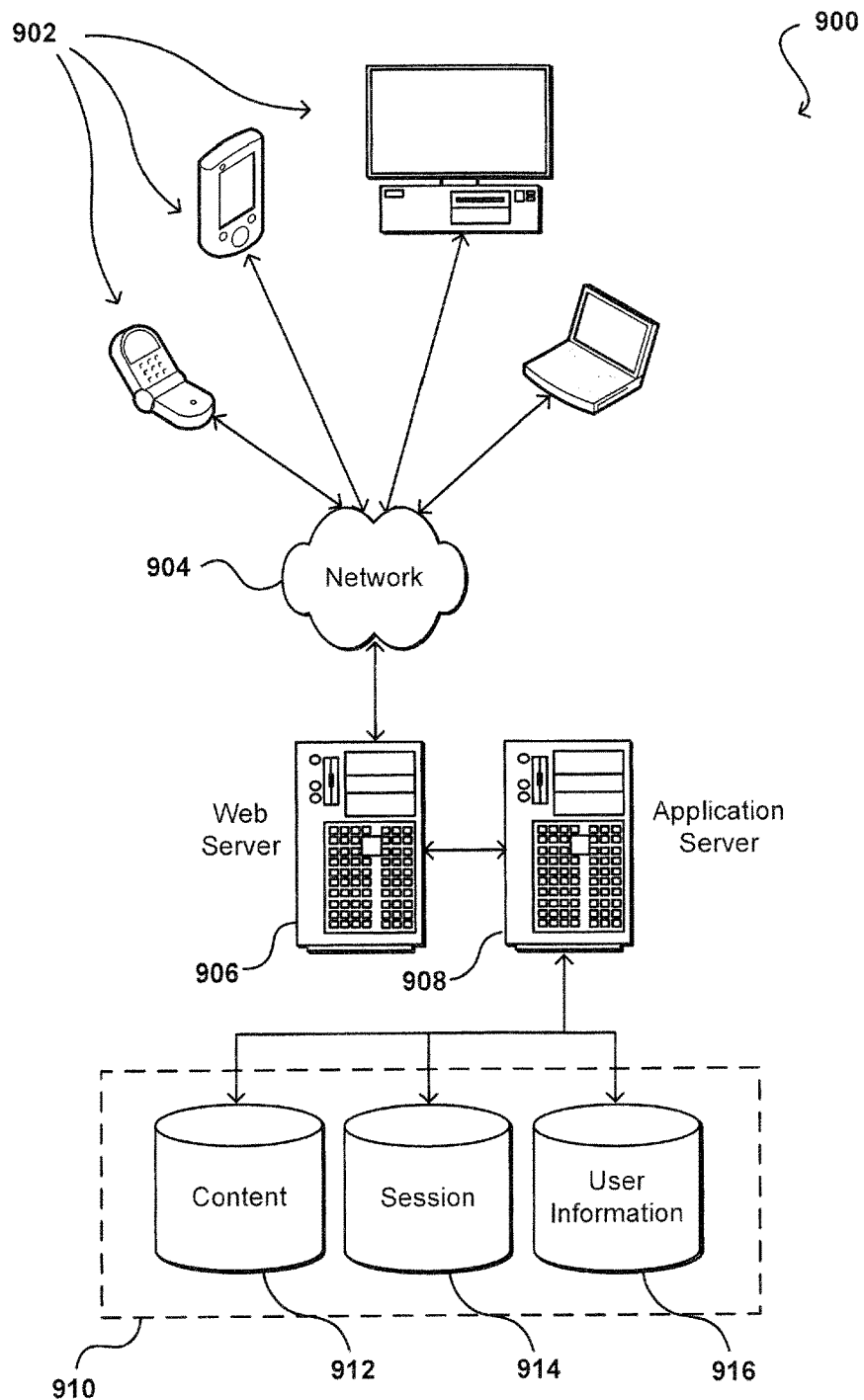
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for dynamically verifying application components using hash functions, comprising:
   receiving a plurality of files, the plurality of files configured to run with an active script-based application on a client;
   receiving a plurality of file identifiers associated with the plurality of files, each file identifier corresponding to a respective file and being created from an output of a first one-way hash function that utilizes contents of the respective file as input;

inputting at least string representations corresponding to the plurality of file identifiers into a second one-way hash function, part of the string representations representative of the contents of the respective file;

generating a single hashed validation code for the string representations of the plurality of file identifiers, the single hashed validation code representing the plurality of file identifiers collectively and being generated based, at least in part, on the inputting of the string representations of the plurality of file identifiers into the second one-way hash function, the single hashed validation code being unique from the plurality of the file identifiers:

transmitting the single hashed validation code to a server for verification;

receiving a message indicating that a verification of the single hashed validation code is successful; and running the application with the plurality of files in response to receipt of the message.

2. The computer-implemented method of claim 1, further comprising:

storing, at the client, one or more cached files;

determining that the one or more cached files are configured to run with the application, the one or more cached files corresponding to one or more file identifiers, each cached filed associated with the respective file identifier; and inputting the respective file identifier for each cached file into the second one-way hash function, wherein the hashed validation code is generated further based, at least in part, on the inputting of the respective file identifier for each cached file into the second one-way hash function.

3. The computer-implemented method of claim 1, wherein the verification of the single hashed validation code is successful when the single hashed validation code matches a verification code, the verification code being generated at the server based, at least in part, on a server-side hashing algorithm that is the same as the second one-way hash function.

4. The computer-implemented method of claim 1, wherein the first one-way hash function and the second one-way hash function utilize the same hashing algorithm.

5. A computer-implemented method comprising:

receiving a plurality of files, the plurality of files configured to run with an application, each file being associated with a respective file identifier that is generated based, at least in part, on at least a portion of a content of the file;

inputting a string representation corresponding to each file identifier into a deterministic function, part of the string representations representative of the portion of the content of the file, and the deterministic function unique from generating based at least in part on the portion of the content of the file;

generating a single validation code representative of the plurality of files, the generating being based, at least in part, on the inputting of the string representation of each file identifier into the deterministic function, the single validation code representing the plurality of files collectively and being unique from each file identifier;

transmitting the single validation code to a server for verification;

receiving a message indicating that the verification of the single validation code is successful; and running the application with the plurality of files in response to receipt of the message.

6. The computer-implemented method of claim 5, further comprising:

receive a second message that the verification of the single validation code is unsuccessful;

presenting an error message in response to receipt of the second message; and requesting transmission from the server of at least some of the files configured for use with the application in response to receipt of the second message.

7. The computer-implemented method of claim 5, wherein the verification of the single validation code is based on a comparison of the single validation code to a verification code generated using a server-side version of the deterministic function.

8. The computer-implemented method of claim 5, wherein, for each file, a respective file identifier is generated based, at least in part, on inputting the portion of the content of the file into a one-way hash function.

9. The computer-implemented method of claim 5, further comprising:

identifying one or more stored files that are also configured for use with the application, the one or more stored files residing with a client-side cache and being associated with one or more stored file identifiers, each stored file corresponding to a respective stored file identifier; and inputting the one or more stored file identifiers into the deterministic function, wherein the single validation code is generated further based, at least in part, on the inputting of the one or more stored file identifiers into the deterministic function.

10. The computer-implemented method of claim 9, wherein the client-side cache is a cache of a web browser running on a client computing device.

11. The computer-implemented method of claim 5, wherein the application is a JavaScript-based web application running on a client computing device.

12. The computer-implemented method of claim 11, wherein the transmitting of the single validation code to the server for verification occurs with one or more AJAX calls from the client computing device to the server.

13. A computer-implemented method comprising:

storing, at a server, a plurality of files, the plurality of files configured to operate with an application running on a client;

generating file identifiers for the plurality of files, each file identifier corresponding to a respective file and each file identifier being generated based, at least in part, on hashing contents of the respective file using a first hash function;

transmitting the plurality of files and the file identifiers for the plurality of files to the client;

generating a single verification code for the plurality of files based, at least in part, on hashing string representations corresponding to the file identifiers using a second hash function, part of the string representations representative of the contents of the respective file;

receiving a validation code representative of the plurality of files received at the client, the validation code generated to represent the plurality of files collectively, the validation code unique from the file identifiers for the plurality of files;

comparing the validation code to the single verification code; and determining that the validation code is valid when the validation code matches the single verification code.

14. The computer-implemented method of claim 13, further comprising:

transmitting, to the client, a message indicating that the plurality of files configured to operate with the application on the client is verified when the validation code is determined to be valid; or transmitting, to the client, an error message when the validation code is determined to be invalid.

15. The computer-implemented method of claim 13, wherein the generating of each file identifier for the respective file is performed within an allowable time period from the transmitting of each file identifier and the respective file to the client.

16. The computer-implemented method of claim 13, wherein the generating of the single verification code is performed within an allowable time period from the generating of the file identifiers for the plurality of files.

17. The computer-implemented method of claim 13, wherein the hashing of the contents of the respective file and the hashing of the file identifiers utilize the same one-way hashing algorithm.

18. A system comprising:

a server;

at least one processor; and a memory device including instructions that, when executed by the at least one processor, cause the system to:

store, at the server, a plurality of files, the plurality of files configured to operate with an application running on a client;

generate file identifiers for the plurality of files, each file identifier corresponding to a respective file and each file identifier being generated based, at least in part, on hashing contents of the respective file using a first hash function;

transmit the plurality of files and the file identifiers for the plurality of files to the client;

generate a single verification code for the plurality of files based, at least in part, on hashing string representations corresponding to the file identifiers using a second hash function, part of the string representations representative of the contents of the respective file;

receive a validation code representative of the plurality of files received at the client, the validation code generated to represent the plurality of files collectively, the validation code unique from the file identifiers for the plurality of files;

compare the validation code to the single verification code; and determine that the validation code is valid when the validation code matches the single verification code.

19. The system of claim 18, wherein the instructions cause the system to further:

transmit, to the client, a message indicating that the plurality of files configured to operate with the application on the client is verified when the validation code is determined to be valid; or transmit, to the client, an error message when the validation code is determined to be invalid.

20. The system of claim 18, wherein the generating of each file identifier for the respective file is performed within an allowable time period from the transmitting of each file identifier and the respective file to the client.

21. The system of claim 18, wherein the generating of the verification code is performed within an allowable time period from the generating of the file identifiers for the plurality of files.

22. A non-transitory computer-readable storage medium including instructions, the instructions when executed by a processor of a computing device causing the computing device to:

receive a plurality of files, the plurality of files configured to run with an application, each file being associated with a respective file identifier that is generated based, at least in part, on at least a portion of a content of the file;

input each file identifier into a deterministic function, the deterministic function unique from generating based at least in part on the portion of the content of the file;

generate a single validation code representative of the plurality of files, the generating being based, at least in part, on the inputting of a string representation corresponding to each file identifier into the deterministic function, part the string representation representative of the portion of the content of the file, and the single validation code representing the plurality of files collectively and being unique from each file identifier;

transmit the single validation code to a server for verification;

receive a message indicating that the verification of the single validation code is successful; and run the application with the plurality of files in response to receipt of the message.

23. The non-transitory computer-readable storage medium of claim 22, wherein the instructions cause the computing system to:

receive a second message indicating that the verification of the validation code is unsuccessful;

present an error message in response to receipt of the second message; and request at least some of the files configured for use with the application in response to receipt of the second message.

24. The non-transitory computer-readable storage medium of claim 22, wherein the application is a JavaScript-based web application running on the computing device.

25. The non-transitory computer-readable storage medium of claim 22, wherein the transmitting of the validation code to the server for verification occurs with one or more AJAX calls from the computing device to the server.

* * * * *